(12) United States Patent
Saravis (10) Patent No.: US 8,302,817 B2
(45) Date of Patent: Nov. 6, 2012

(54) FLUID DISPENSER

(76) Inventor: Darren Saravis, Long Beach, CA (US)

( * ) Notice: Subject to any disclaimer, the term of this patent is extended or adjusted under 35 U.S.C. 154(b) by 563 days.

(21) Appl. No.: 12/311,272

(22) PCT Filed: Sep. 24, 2007

(86) PCT No.: PCT/US2007/079312
§ 371 (c)(1),
(2), (4) Date: Mar. 23, 2009

(87) PCT Pub. No.: WO2008/036974
PCT Pub. Date: Mar. 27, 2008

(65) Prior Publication Data
US 2009/0308890 A1    Dec. 17, 2009

Related U.S. Application Data

(60) Provisional application No. 60/846,655, filed on Sep. 22, 2006, provisional application No. 60/893,879, filed on Mar. 8, 2007.

(51) Int. Cl.
*B67D 7/70* (2010.01)

(52) U.S. Cl. ............ 222/135; 222/1; 222/129; 222/130; 222/207; 222/209

(58) Field of Classification Search .............. 222/1, 129, 222/130, 136–137, 94, 205, 206–207, 209, 222/321.7, 321.9, 251, 252–255, 321.8, 372, 222/135
See application file for complete search history.

(56) References Cited

U.S. PATENT DOCUMENTS

| | | | | |
|---|---|---|---|---|
| 2,942,762 A * | 6/1960 | Fahr | ............................... | 222/207 |
| 5,169,029 A * | 12/1992 | Behar et al. | ........................ | 222/1 |
| 5,617,976 A * | 4/1997 | Gueret | ........................... | 222/380 |
| 6,082,588 A * | 7/2000 | Markey et al. | ................ | 222/137 |
| 6,640,999 B2 * | 11/2003 | Peterson | ........................ | 222/135 |
| 6,675,845 B2 * | 1/2004 | Volpenheim et al. | ........ | 141/380 |
| 6,720,501 B1 * | 4/2004 | Henson | .......................... | 174/262 |
| D619,853 S * | 7/2010 | Saravis | .......................... | D7/598 |
| 2004/0251274 A1 * | 12/2004 | Ponton | ........................... | 222/134 |
| 2004/0262339 A1 * | 12/2004 | Stradella | ......................... | 222/633 |
| 2008/0277419 A1 * | 11/2008 | Holcomb et al. | ............. | 222/129 |

* cited by examiner

*Primary Examiner* — Frederick C. Nicolas
(74) *Attorney, Agent, or Firm* — The Eclipse Group LLP (57) ABSTRACT

A fluid dispenser is disclosed having a storage chamber for storing a liquid, a collection assembly for collecting a portion of liquid, a pump assembly, and a tube extending from within the storage chamber to within the collection chamber through which the portion of liquid is pumped into the collection assembly. The pump assembly includes one or more pump actuators, and the fluid dispenser may have multiple storage chambers, each having a corresponding tube. In addition, the fluid dispenser may have multiple collection chambers. The pump actuators may be, for example, a flexible diaphragm or a trigger-actuated pump mounted on the side of the fluid dispenser. The pump mechanism may be incorporated into the capillary, and it may be, for example, a piston pump or any other type of pump known in the art.

22 Claims, 11 Drawing Sheets

FLUID DISPENSER

RELATED APPLICATIONS

This application claims priority to Provisional Patent Application No. 60/846,655 filed on Sep. 22, 2006, titled FLUID DISPENSER, and Provisional Patent Application No 60/893,879 filed on Mar. 8, 2007, titled FLUID DISPENSER; both applications of which are incorporated in their entireties by reference in this application.

BACKGROUND OF THE INVENTION

1. Field of the Invention

This invention relates generally to the field of fluid dispensers. In particular, the invention relates to a pump-actuated fluid dispenser.

2. Related Art

Numerous different types of fluids are often stored in containers having a means for dispensing the fluid from the container. Typically, the fluid is dispensed from the top of the container by means of gravity when a user manually turns the container over so that the fluid may be poured out. In such a system, one-handed dispensing is possible; however, dispensing of the fluid may be difficult when only a small amount of fluid is remaining in the dispenser, or if trying to dispense a precise amount of the fluid. Various other types of dispensers are known, including those that use a pump actuator to dispense the fluid, such as liquid hand-soap dispensers. However, such pump-actuating dispensers do not provide a user with adequate control over the amount of fluid being dispensed. Further, such dispensers (such as a conventional soap pump dispenser) typically require both hands to dispense and collect the contents, and thus require more coordination than a simple pour-dispenser. Thus, it is desirable to have an easier-to-use pump-actuated dispenser. It is also desirable to have a fluid dispenser that combines the ease and accuracy of a pour-type dispenser, with the efficiency and accuracy of a pump-type fluid dispenser.

SUMMARY

A fluid dispenser may include a single storage chamber or multiple storage chambers. In one example of an implementation, the fluid dispenser may be a dual storage chamber dispenser for use in dispensing consumable items such as oil and vinegar for salad dressing. In such an implementation, there may be two separate storage chambers, each including a capillary tube extending from the bottom of the respective storage chamber to the top, and each storage chamber having a pump actuator in communication with the respective capillaries for pumping a fluid up from the bottom of the storage chamber.

In another example, there may be only one storage chamber, one capillary, and one pump actuator. In either case, a lip may be provided for pouring fluid that has been drawn up by the pump actuator through the capillary. In a further implementation, the pump actuator may have a trigger mounted on the side of the fluid dispenser whereby movement of the trigger actuates an internal pump mechanism, causing fluid to be drawn from the bottom of the storage chamber to the top of the dispenser. The pump mechanism may be incorporated into the capillary, and it may be, for example, a piston pump or any other type of pump known in the art.

BRIEF DESCRIPTION OF THE DRAWINGS

The invention may be better understood by referring to the figures. The components in the figures are not necessarily to scale, emphasis instead being placed upon illustrating the principles of the invention.

DETAILED DESCRIPTION

Figure 1:
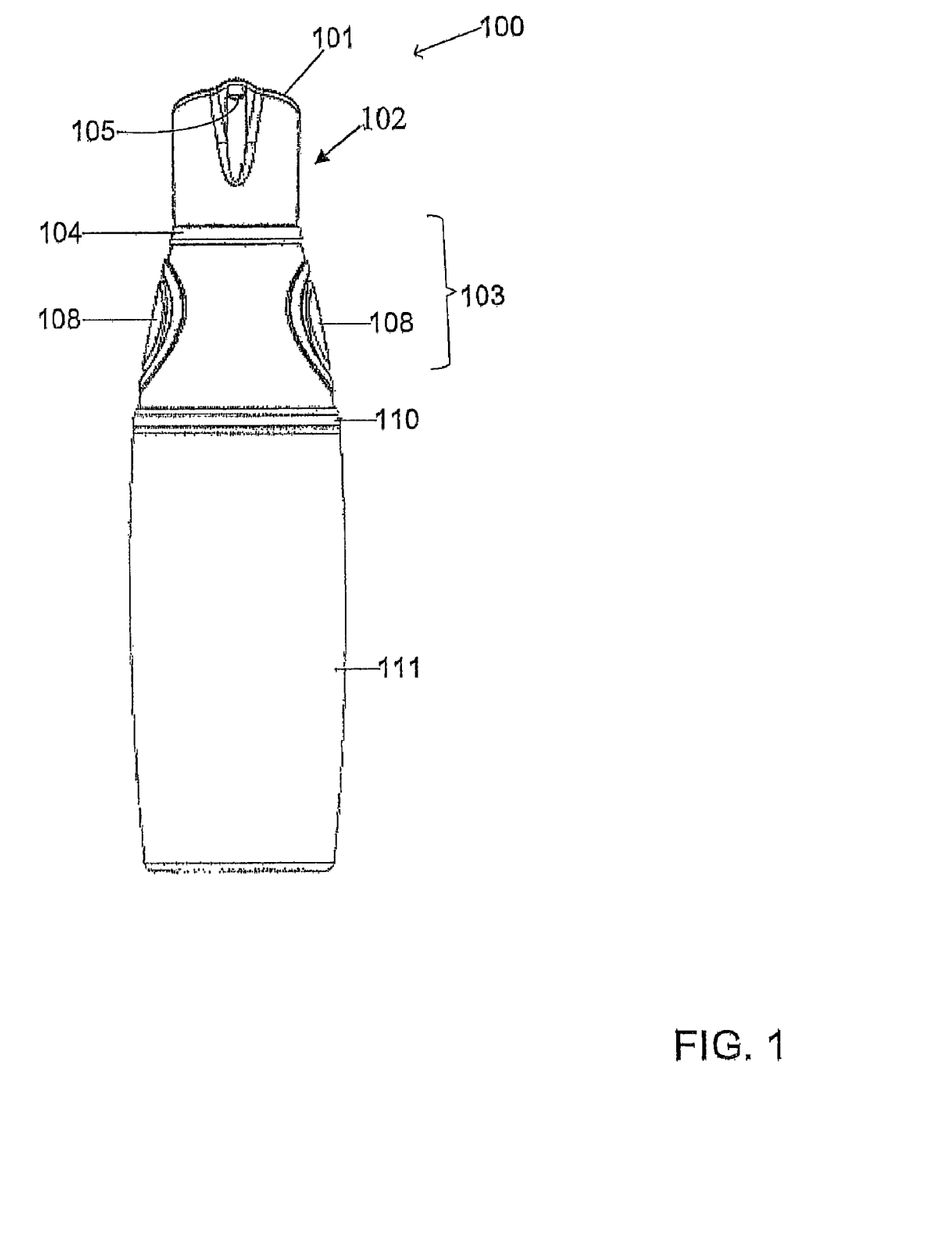
FIG. 1 is a front view of an implementation of a fluid dispenser.
Figure 2:
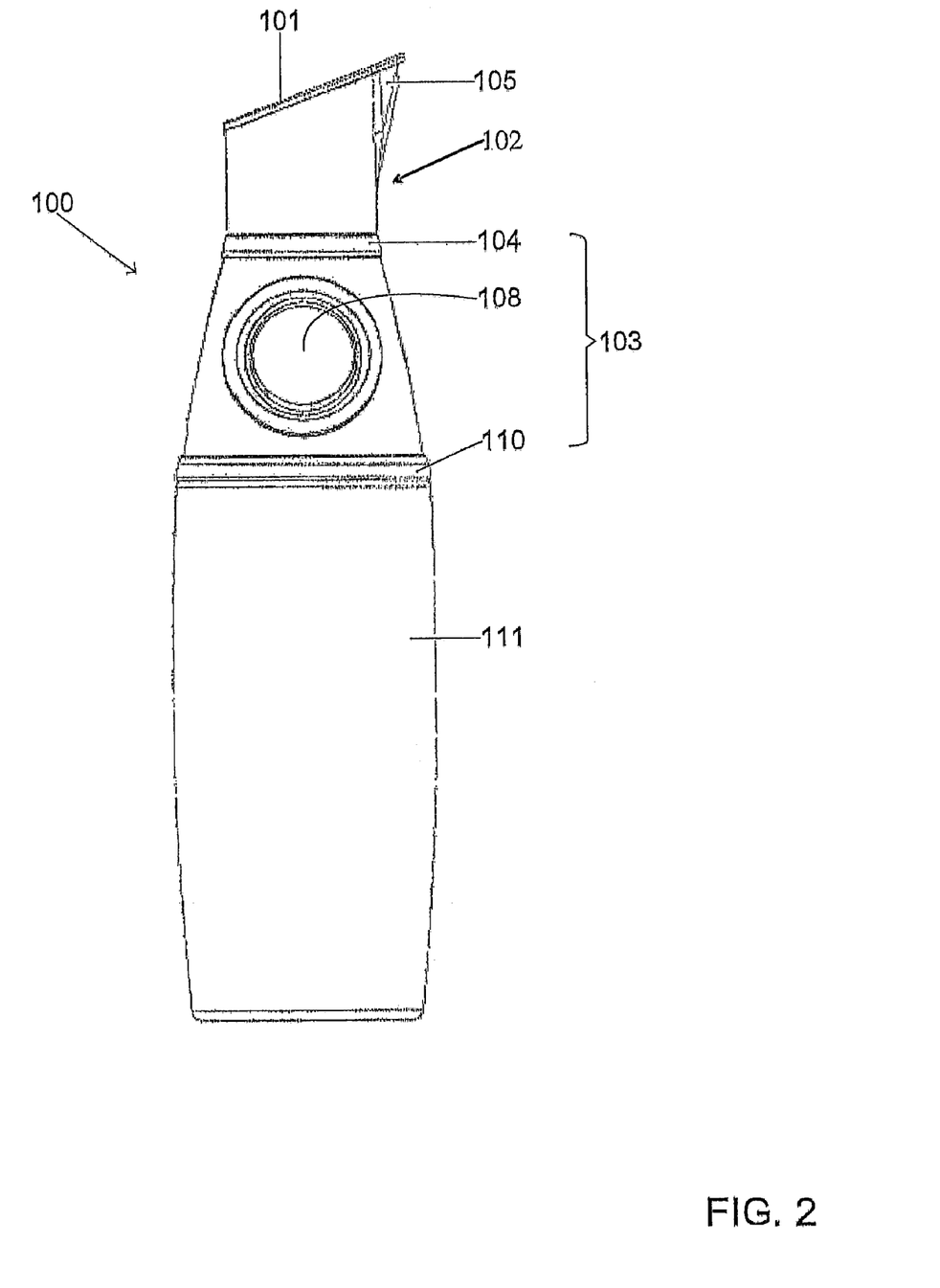
FIG. 2 is a side view of the fluid dispenser of FIG. 1.

FIG. 1 is a front view of one implementation of a fluid dispenser 100 according to the invention. FIG. 2 is a side view of the fluid dispenser of FIG. 1. As illustrated in both FIGS. 1 & 2, the fluid dispenser 100 may include a storage chamber 111, a bottom connecting ring 110, a pump assembly 103 having one or more pump actuators 108, a top connecting ring 104, a collection assembly 102 a lid 101 and one or more spouts 105. While the implementation of FIGS. 1 and 2 utilize two convex diaphragms 108, one of skill in the art will recognize that other types of pumps may be utilized, such as a piston pump, trigger pump, vacuum pump or other type of pump appropriate for pumping small amounts of consumable liquids out of a containment member. Further, as an alternative to the dual pump-actuator shown in FIG. 1, a single pump-actuator, or more than two pump-actuators, may be utilized.

In the implementation illustrated in FIGS. 1 and 2, the bottom connecting ring 110 may be used to couple the storage chamber 111 with the pump assembly 103, and the top connecting ring 104 may be used to couple the pump assembly 103 with the collection assembly 102. Alternatively, one or more of these separate components may be combined to form a single component. For example, the storage chamber 111 together with the pump assembly 103 may be integrally formed to create a single component. Similarly, the pump assembly 103 together with the collection assembly 102 may be integrally formed to create a single component.

Figure 3:
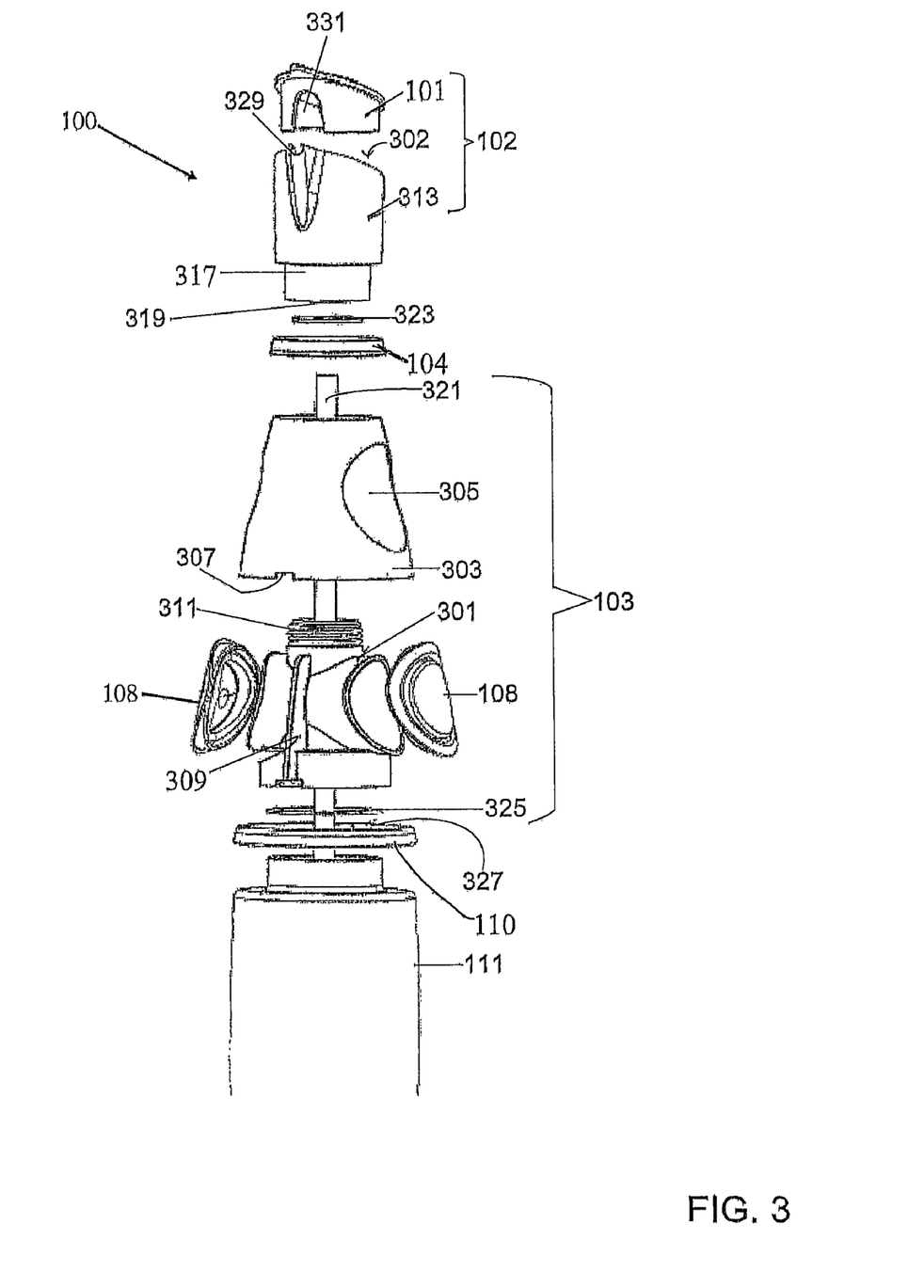
FIG. 3 an exploded view of the fluid dispenser of FIG. 1.

FIG. 3 is an exploded view of the fluid dispenser 100 of FIG. 1. As illustrated, the pump assembly 103 of the fluid dispenser 100 includes a pump housing 301, one or more convex diaphragms 108, and a pump cover 303. The pump cover 303 may include one or more apertures 305 through which each diaphragm 108 fits. The pump cover 303 many also include one or more notches 307 for use in aligning the pump cover 303 so that the aperture(s) 305 will correctly align with the respective diaphragm(s) 108. In such an implementation, the pump housing 301 may include one or more ribs 309 for guiding the notches 307 for proper alignment. Each rib 309 may further engage with a corresponding ridge (not shown) along the inside of the pump cover 303 to facilitate the proper alignment.

As also illustrated in FIG. 3, the collection assembly 102 includes a collection housing 313 and a lid 101. The collection housing 313 may include a collection compartment 302 in which the collected fluid awaits dispensing, and one or more spouts 329, via which fluid collected in the collection compartment 302 from the storage chamber 111 may be poured or dispensed.

In the implementation disclosed in FIGS. 1-3, the pump housing 301 may include a top coupling portion 311, while the collection housing 313 may include a lower coupling portion 317. The collection housing 313 may be coupled to the pump housing 301 via the lower coupling portion 317 and the top coupling portion 311. In one implementation, the inside surface (not shown) of the lower coupling portion 317 and the outside surface of the top coupling portion 311 may each be threaded such that the respective threaded surfaces may be coupled to each other in a screw-like fashion. Alternatively, the lower coupling portion 317 and the top coupling portion 311 may be coupled by a friction fit, clamp, screw mechanism, snap action or some other known coupling mechanism. The lower coupling portion 317 may further include a tooth 319 to assist in proper alignment of the collection assembly 102 with the pump assembly 103.

As previously explained, the fluid dispenser 100 may include a top connecting ring 104 for coupling the pump assembly 103 with the collection assembly 102, and a bottom connecting ring 110 for coupling the storage chamber 111 with the pump assembly 103. A top gasket 323 and bottom gasket 325 may be provided to seal the respective assemblies or portions when being coupled with the top connecting ring 104 or the bottom connecting ring 110. Further, the lower bottom connecting ring 110 may include one or more notches 327 for further assisting in proper alignment of the pump housing 301.

The fluid container 100 may further include a tube 321, such as a capillary tube, extending from within the storage chamber 111 to within the collection housing 313. The tube 321 is in communication with the pump actuators 108 to allow pumping of a fluid from within the storage chamber 111 up into the collection housing 313. The height of the tube 321 may function to limit the fluid height in the collection compartment 302. In such an implementation, if the height of the fluid drawn up into the collection compartment 302 exceeds the height of the tube 321, the excess fluid is drawn back down through the tube into the storage chamber 111. Alternatively, one or more one-way valves may be used in the tube 321 to prevent the flow of fluid back into the storage chamber 111. In the implementation shown in FIGS. 1-3, there is a single storage chamber 111. However, as further illustrated below, in connection with FIG. 4, two or more storage chambers are possible.

The storage chamber(s) 111 may be formed from a rigid material such as glass, rigid plastic, or metal. Each pump actuator 108 may be a flexible attachment, such as a diaphragm made of rubber or other flexible material, secured to the pump housing 301 by any appropriate means such as, for example, a friction fit, clamp, adhesive, snap action or screw mechanism. The pump actuators 108 may be substantially symmetrically located on either side of the pump housing such that they are substantially level with each other within a horizontal plane.

Figure 4:
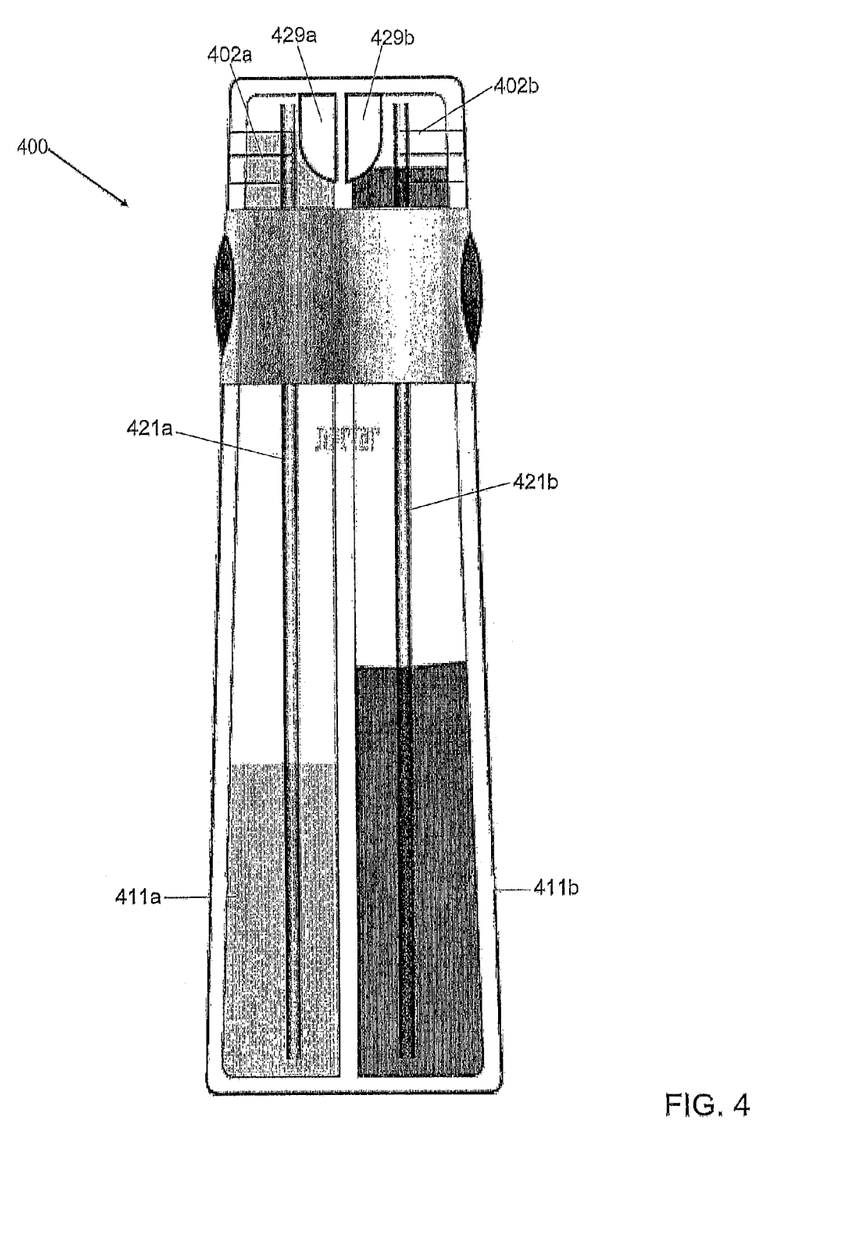
FIG. 4 is a front view of an implementation of a dual storage chamber fluid dispenser.

FIG. 4 is a front view of an implementation of a dual storage chamber fluid dispenser 400. As illustrated in FIG. 4, a fluid dispenser 400 according to the invention may have two or more storage chambers 411a and 411b, where each storage chamber 411a, 411b has a corresponding tube 421a and 421b respectively. Such an implementation may be referred to as a dual storage chamber or multi storage chamber fluid dispenser 400. In addition, the collection assembly 102, may include multiple chambers within the collection housing 313, such that each storage chamber 411a, 411b may draw fluid up into a separate, corresponding collection compartment 402a, 402b respectively, where each collection compartment 402a, 402b may have a corresponding spout 429a, 429b or, alternatively, a shared spout (not shown). Alternatively in a dual storage chamber implementation, the collection housing 313 may include two storage chambers, each having a separate tube, and a single collection compartment (e.g., 302 in FIG. 3) with a single spout (e.g., 329 in FIG. 3), such that when the respective fluids from each storage chamber 411a, 411b are drawn into the single collection compartment, the fluids may be mixed together and the mixture dispensed from a single spout.

The collection housing 313 has a floor (not shown) which prevents fluid that has been drawn into the collection compartment(s) 402a and/or 402b from re-entering the storage chamber(s) 411a and/or 411b, respectively. As explained, in the case of a dual storage chamber fluid dispenser, the collection assembly 102 near the top of the fluid dispenser 400 may include two separate collection compartments 402a, 402b, each having its own-spout 429a, 429b. In this dual storage chamber fluid dispenser implementation, each spout 429a, 429b may have a corresponding barrier so that fluid drawn up into the respective collection compartments 402a, 402b may be selectively dispensed one at a time or together. The barrier may be, for example, a stopper similar to a wine bottle cork, or it may be provided by the lid 315 of the collection assembly 102. The lid 315 may have, for example, one or more open (e.g., U-shaped) or closed apertures 331, such that when the lid 315 is rotated while positioned on the collection housing 313, the hole or holes 331 align with the spout(s) 329, 429a, 429b as appropriate, to either allow or impede the flow of fluid out of the collection compartment 302.

Figure 5:
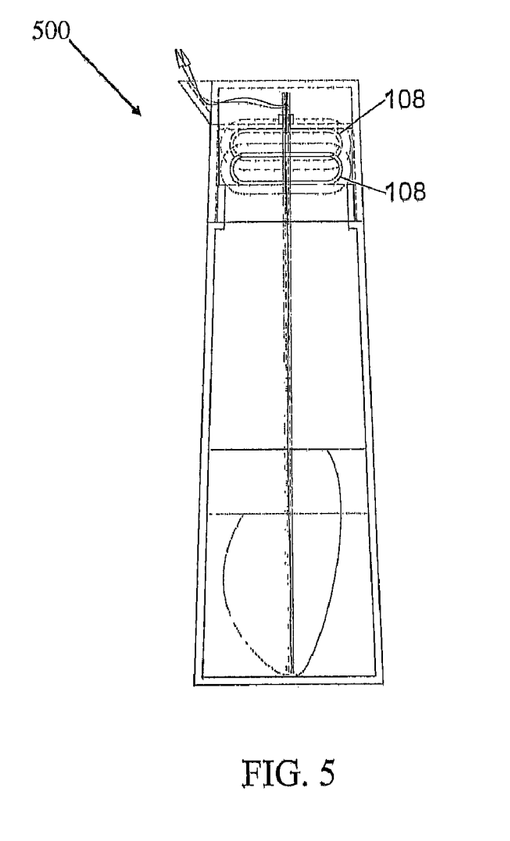
FIG. 5 is a cross-sectional side view of a dual storage chamber fluid dispenser having asymmetrically located pump actuators.
Figure 6:
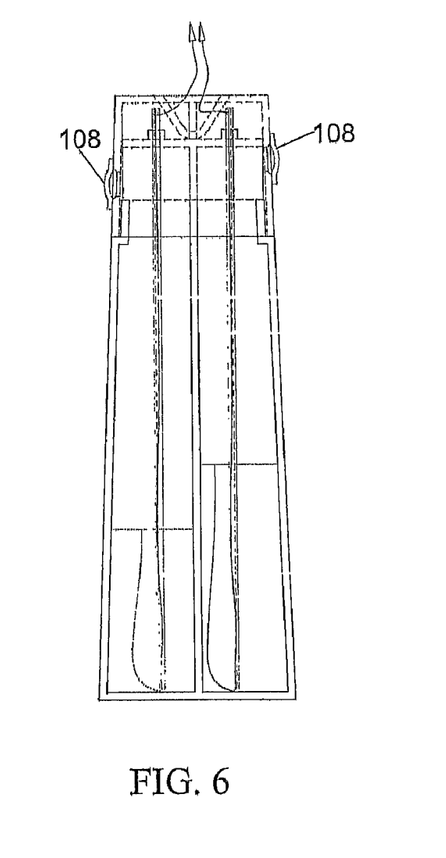
FIG. 6 is a cross-sectional front view of the dual storage chamber dispenser as shown in FIG. 5.

FIG. 5 is a cross-sectional side view of a dual storage chamber fluid dispenser 500 having asymmetrically located pump actuators 108. FIG. 6 is a cross-sectional front view of the dual storage chamber dispenser 500 as shown in FIG. 5.

As illustrated in FIGS. 5 and 6, one of the pump actuators 108 may be vertically offset such that it is in a lower horizontal plane than the other pump actuator 108. With such an implementation, a user is less likely to press both of the pump actuators 108 when he or she intends only to press one. Thus, the user is better able to control the amount of fluid being drawn up into the collection compartment(s) 302, 402a, 402b. This may be particularly useful in a dual storage chamber implementation, where it is only desired to dispense fluid from one of the storage chambers 411a, 411b or when a different amount of fluid is desired to be drawn from each chamber 411a, 411b.

As explained, in the implementation illustrated in FIGS. 1-6, each pump actuator 108 may be a flexible convex diaphragm which, when pressed, is depressed inward thus forcing fluid to flow up through the tube 321, 421a, 421b from the storage compartment 111, 411a, 411b and into the collection compartment 302, 402a, 402b. When depressed by a user, air within the bulbous portion of the diaphragm 108 is displaced thus decreasing the overall volume of air within the storage chamber 111, 411a, 411b. The decreased air volume causes an increase in pressure on the fluid, forcing the fluid upward through the tube 321, 421a, 421b and into the collection compartment 302, 402a, 402b.

Figure 7:
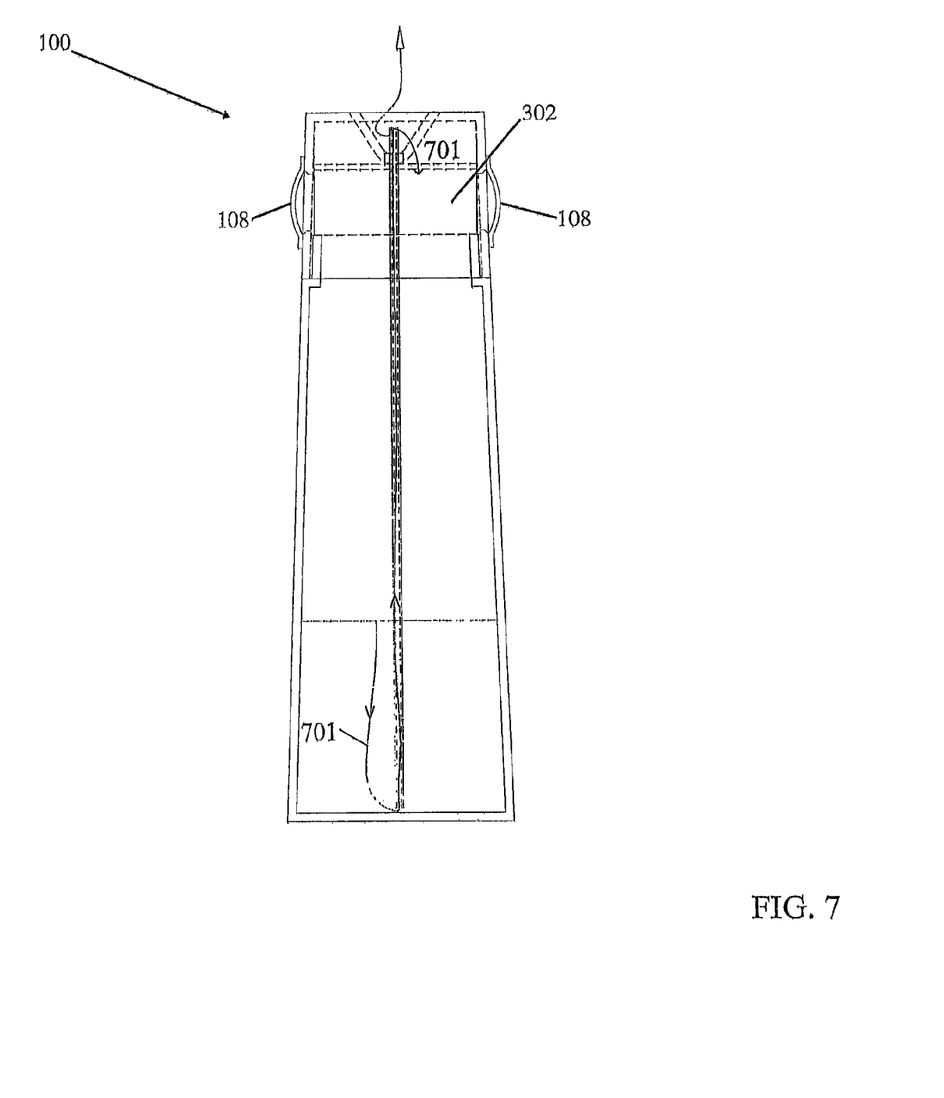
FIG. 7 is a cross-sectional front view of a fluid dispenser showing the direction of fluid flow.

FIG. 7 is a cross-sectional front view of a single chamber fluid dispenser 100 showing the direction of fluid flow. In the implementation of FIG. 7, the flow of fluid 701 into the collection compartment 302 may be increased if both pump actuators 108 are pressed, or decreased if a single pump actuator is pressed 108, thus allowing for finer portion control. Further, the fluid flow may increase or decrease with the amount of force applied to the pump actuator(s) 108.

Figure 8:
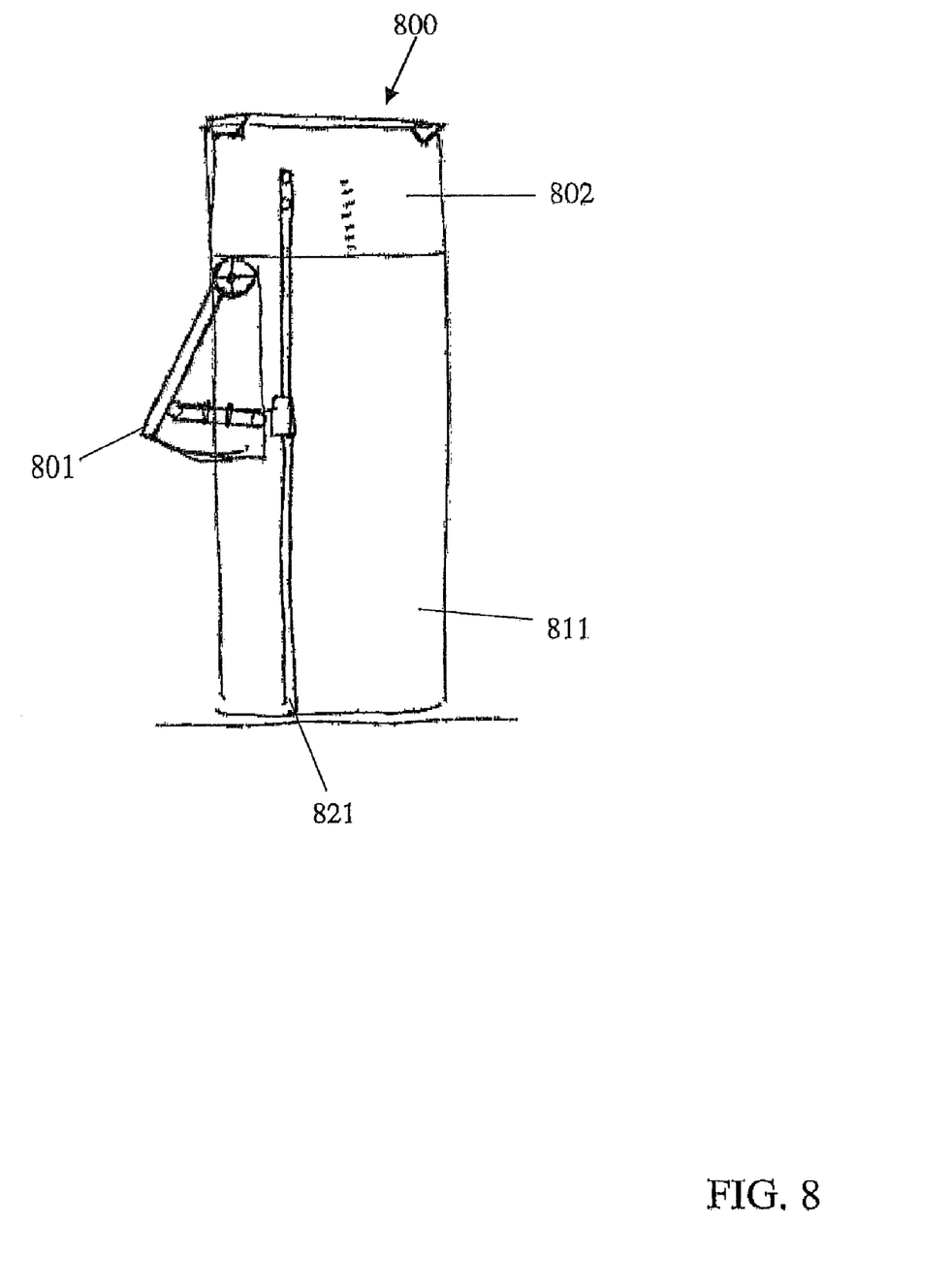
FIG. 8 is a cross-sectional side view of a first implementation of a fluid dispenser with a pump-actuating trigger mounted on the side of the fluid dispenser.
Figure 9:
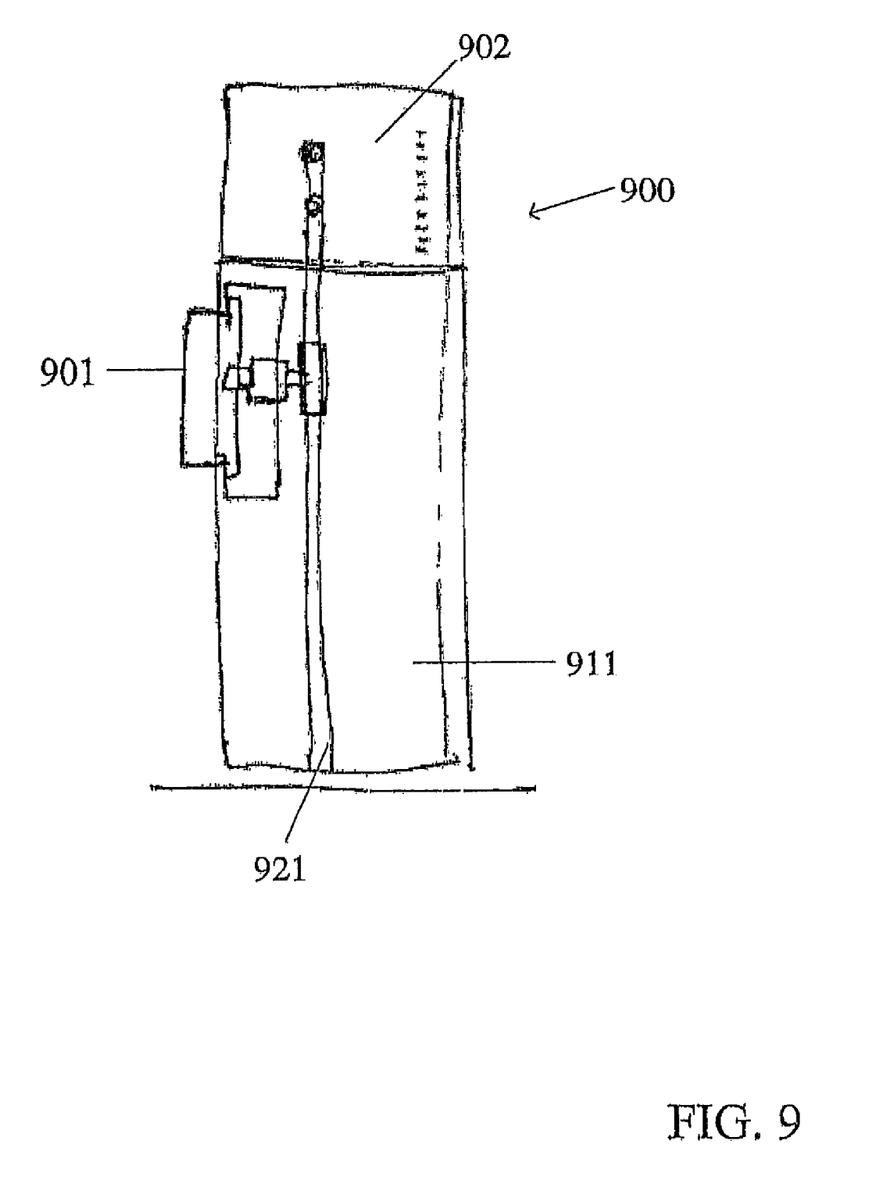
FIG. 9 is a cross-sectional side view of a second implementation of a fluid dispenser with a pump-actuating trigger mounted on the side of the fluid dispenser.
Figure 10:
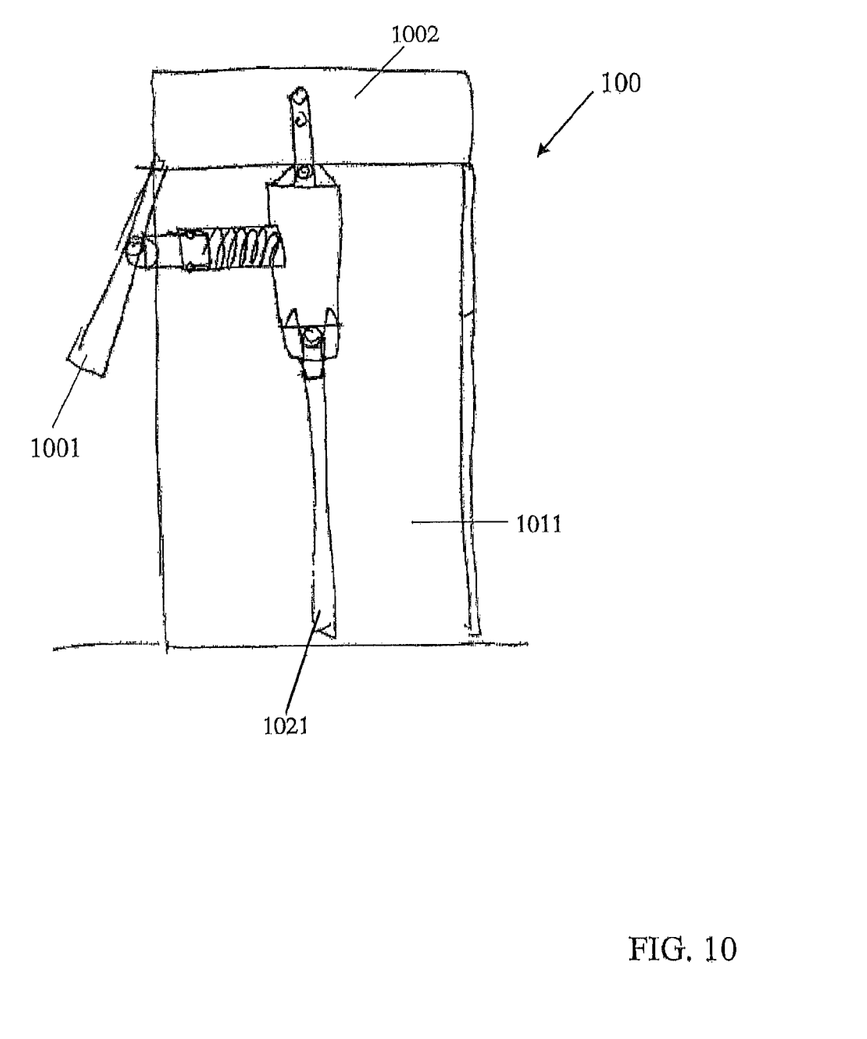
FIG. 10 is a cross-sectional side view of a third implementation of a fluid dispenser with a pump-actuating trigger mounted on the side of the fluid dispenser.

FIGS. 8-10 show cross-sectional side views of a first, second and third implementation of a fluid dispenser 800, 900, 1000 with a spring-loaded pump-actuator 801, 901, 1001 mounted on the side of the fluid dispenser 800, 900, 1000. As illustrated in the examples shown in. FIGS. 8-10, the pump actuator 801, 901, 1001 may be a spring-loaded trigger mechanism mounted on the side of the fluid dispenser 800, 900, 1000, whereby movement of the trigger actuates an internal pump mechanism, causing fluid to be drawn from the bottom of the storage chamber 811, 911, 1011 to the top of the fluid dispenser 800, 900, 1000. The pump mechanism may be incorporated into the tube 821, 921, 1021 and/or it may be, for example, a piston pump or any other type of pump known in the art.

In each of the examples shown in FIGS. 8-10, the respective triggers 801, 901, 1001 activate a small pump, such us a reciprocating piston pump, in communication with the tube 821, 921, 1021, respectively, which draws the fluid from the storage chamber 811, 911, 1011 into the corresponding collection compartment 802, 902, 1002. One or more one-way valves may be used to prevent the flow of liquid back into the storage chamber 811, 911, 1011. In addition to these reciprocating piston-type pumps, other types of standard piston pumps well known in the industry may be used to draw fluid from the storage chamber(s) 811, 911, 1011 into the corresponding collection compartment(s) 802, 902, 1002.

Figure 11:
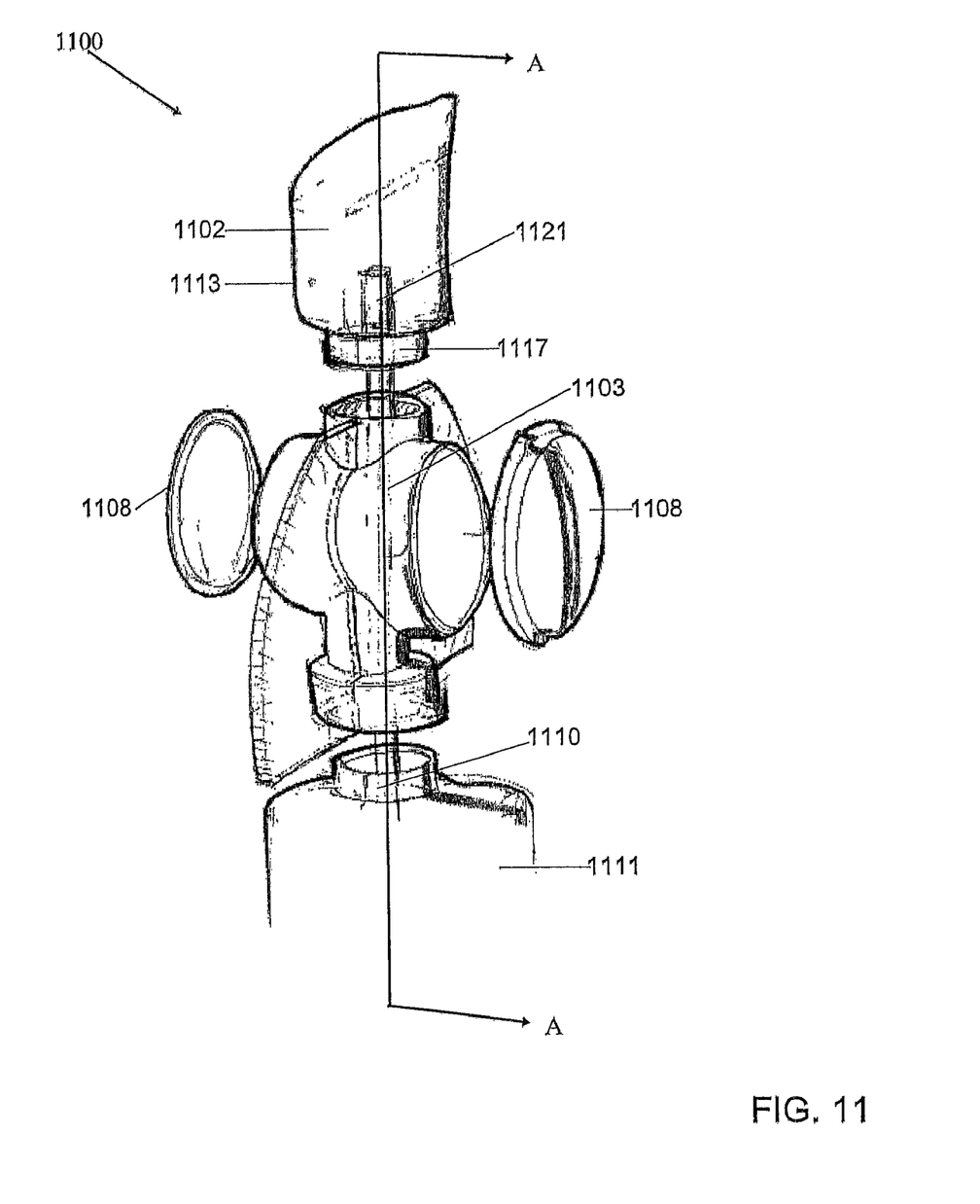
FIG. 11 is an exploded perspective view of the top portion of an alternative implementation of a fluid dispenser such as in FIG. 1.

FIG. 11 is an exploded perspective view of the top portion of an alternative implementation of a fluid dispenser 1100. FIG. 11 illustrates a tube 1121 extending upward into a collection compartment 1102 of a collection housing 1113 having a cap, and two pump actuators 1108 on either side of a pump assembly 1103. The collection housing 1113 may include a lower coupling portion 1117 in removable engagement with the pump assembly 1103. Additionally or alternatively, the storage chamber 1111 may include a top coupling portion 1110 in removable engagement with pump assembly 1103. These removable engagements may be accomplished via, for example, a friction-fit, snap-action fit, or a threaded screw-like fit.

Figure 12:
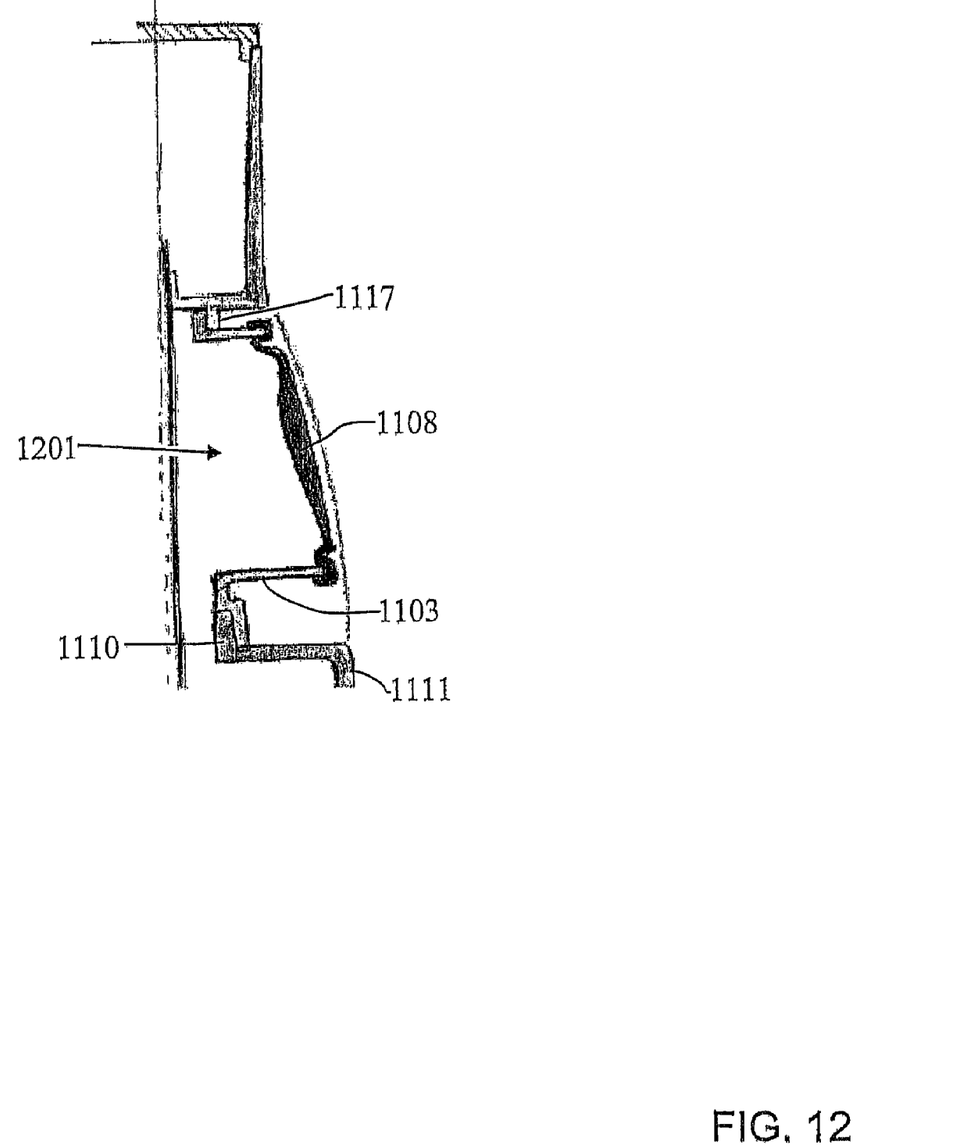
FIG. 12 is a cross-sectional side view of one half of the portion of the fluid dispenser in FIG. 11 taken along a vertical plane A-A.

FIG. 12 is a cross-sectional side view of one half of the portion of the fluid dispenser 1100 in FIG. 11 taken along a vertical plane A-A extending symmetrically through each pump actuator 1108. In particular, as illustrated in FIG. 12, the top coupling portion 1110 may be coupled to the pump assembly 1103 via a friction fit as illustrated. Similarly, the lower coupling portion 1117 may also be coupled to the pump assembly 1103 via a friction fit as illustrated. The diaphragm 1108 may be adhered around the edge of an aperture 1201 within the pump assembly 1103 as illustrated in FIG. 12, such that the adhesion creates a watertight seal.

In operation, the fluid dispenser of the invention may be utilized to dispense, for example, oil, vinegar, or both oil and vinegar in a single or dual chamber fluid dispenser. Thus, it may be desirable to allow for finer portion control in dispensing these types of fluids, as described above. Further, it may be desirable to dispense more of one type of liquid than the other type of liquid when stored in separate storage chambers. Thus, having more than one pump actuator may be desirable. Mixing liquids in a single collection chamber dispensed through a single spout may also be desirable. However, for certain applications, it may be desirable to keep the two liquids separate, as illustrated in connection with the implementation of FIG. 4, and dispense the liquids through separate spouts that mix upon pouring.

In all of the above examples, to help in determining the amount and type of fluid contained in a fluid dispenser, the storage container may be transparent in appearance, such that the fluid type and amount of fluid may be viewed through the container. Further, the collection chamber may also be made to be transparent, to assist with determining the amount of liquid to be dispensed.

In all of the above examples of implementations, the pump actuators may be calibrated such that each press of the actuators will dispense a precise amount of liquid in the collection chamber. For example, one pump may yield 1 ml of liquid dispensed to the collection chamber (i.e., each pump will yield one tablespoon of liquid). In this manner, when the pump is actuated, the amount of liquid that is displaced into the collection chamber is calibrated such that the pump actuator displaces only a predetermined amount. Additionally, the collection chamber may include measurement bars for assisting with measuring the amount of liquid collected in a single or dual collection chamber. Further, the pump actuators may allow the user to vary the pressure placed on the pump actuators such that the amount of pressure asserted may vary the amount of liquid dispensed into the collection chamber (e.g., the more pressure exerted, the more liquid dispensed). In this manner, measurement bars located on the collection chamber may be particularly helpful in determining the amount of liquid to be dispensed.

Any of the fluid dispensers described above may also include a release mechanism in the floor of the collection compartment that allows a user to release any fluid collected in the collection compartment back into the respective storage chamber. In addition, to prevent mistakenly drawing up fluid into a dispensing compartment without intending or desiring to do so, the particular pump actuator used in the fluid dispenser may include a locking mechanism or guard so as to prevent the user for pumping any fluid through the tube(s).

Notwithstanding the illustrations, the fluid dispenser may include any type of pump actuator that could be incorporated into the fluid dispenser to draw fluid up through a capillary. For example, the diaphragms shown in the various figures represent one example of various implementations. Likewise, mechanisms other than triggers mounted on the side of the fluid dispensers shown in FIGS. 8-10 may be substituted with other equivalent structures.

What is claimed is:
1. A combined fluid collection and dispensing device comprising:
 a storage chamber for storing a liquid;
 a collection assembly for collecting a portion of liquid, the collection assembly including a collection chamber having a floor, and a spout via which the portion of liquid is dispensed;

a pump assembly comprising a first pump actuator and a second pump actuator, wherein the first pump actuator is in a different horizontal plane than the second pump actuator; and a tube extending from within the storage chamber to within the collection chamber through which the portion of liquid is pumped into the collection assembly.

2. The combined fluid collection and dispensing device of claim 1 wherein the portion of liquid has a maximum volume based on a height of the tube.

3. The combined fluid collection and dispensing device of claim 1 wherein at least one of the first pump actuator and the second pump actuator is a flexible diaphragm.

4. The combined fluid collection and dispensing device of claim 1 wherein at least one of the first pump actuator and the second pump actuator is a piston.

5. The combined fluid collection and dispensing device of claim 1 further comprising a barrier for selectively impeding the flow of the portion of liquid from the spout.

6. The combined fluid collection and dispensing device of claim 1 wherein the combined fluid collection and dispensing device is calibrated such that the portion of liquid that is collected and dispensed is a predetermined amount of liquid with each actuation of either the first pump actuator or the second pump actuator.

7. A combined fluid collection and dispensing device comprising:
a first storage chamber for storing a first liquid;
a second storage chamber for storing a second liquid;
a collection assembly for collecting a portion of the first liquid and a portion of the second liquid, the collection assembly including a collection chamber having a floor, and a spout via which the portion of the first liquid and the portion of the second liquid is dispensed;
a pump assembly comprising a pump actuator including a flexible diaphragm;
a first tube extending from within the first storage chamber to within the collection chamber through which the portion of the first liquid is pumped into the collection assembly; and
a second tube extending from within the second storage chamber to within the collection chamber through which the portion of the second liquid is pumped into the collection assembly.

8. The combined fluid collection and dispensing device of claim 7 wherein the collection assembly comprises a first collection chamber in which the portion of the first liquid is collected, and a second collection chamber in which the portion of the second liquid is collected.

9. The combined fluid collection and dispensing device of claim 8 wherein the collection assembly comprises a first spout corresponding to the first collection chamber and a second spout corresponding to the second collection chamber.

10. The combined fluid collection and dispensing device of claim 9 further comprising a barrier for selectively impeding the flow of liquid from at least one of the first spout or the second spout.

11. The combined fluid collection and dispensing device of claim 7 wherein the pump assembly comprises a first pump actuator and a second pump actuator, and wherein at least one of the first pump actuator and the second pump actuator includes the flexible diaphragm.

12. The combined fluid collection and dispensing device of claim 11 wherein actuation of the first pump actuator causes the portion of the first liquid to be collected in the collection chamber, and actuation of the second pump actuator causes the portion of the second liquid to be collected in the collection chamber.

13. The combined fluid collection and dispensing device of claim 11 wherein the actuation of the first pump actuator causes a predetermined amount of the first liquid to be collected in the collection chamber, and wherein the actuation of the second pump actuator causes a predetermined amount of the second liquid to be collected in the collection chamber.

14. The combined fluid collection and dispensing device of claim 7, further comprising a third storage chamber for storing a third liquid, and a third tube extending from within the third storage chamber to within the collection chamber through which a portion of the third liquid is pumped into the collection assembly.

15. The combined fluid collection and dispensing device of claim 7, wherein the portion of the first liquid has a maximum volume based on a height of the first tube and the portion of the second liquid has a maximum volume based on a height of the second tube.

16. The combined fluid collection and dispensing device of claim 11, wherein the first pump actuator is level with the second pump actuator within a horizontal plane.

17. The combined fluid collection and dispensing device of claim 11, wherein the first pump actuator is in a different horizontal plane than the second pump actuator.

18. A method of collecting and dispensing fluid comprising:
storing a first liquid in a first rigid storage chamber;
storing a second liquid in a second rigid storage chamber;
actuating at least one of a first pump actuator and a second pump actuator, wherein at least one of the first pump actuator and the second actuator includes a flexible diaphragm;
selectively collecting at least one of a portion of the first liquid from the first storage chamber and a portion of the second liquid from the second storage chamber in a collection chamber, wherein the portion of the first liquid is collected via a first tube extending from within the first storage chamber to within the collection chamber and the portion of the second liquid is collected via a second tube extending from within the second storage chamber to within the collection chamber; and
dispensing the portion of liquid collected in the collection chamber.

19. The method of claim 18 wherein the collecting step comprises selectively collecting at least one of a portion of the first liquid in a first collection chamber and a portion of the second liquid in a second collection chamber.

20. The method of claim 18 where actuating at least one of the first pump actuator and the second pump actuator causes a predetermined amount of liquid to be displaced into the collection chamber.

21. A combined fluid collection and dispensing device comprising:
a storage chamber for storing a liquid;
a collection assembly for collecting a portion of liquid, the collection assembly including a collection chamber having a floor, and a spout via which the portion of collected liquid is dispensed;
a pump assembly having a first and second pump actuator for collecting at least one of a portion of the liquid in the collection chamber by drawing the liquid into the collection chamber, where a first amount of fluid is drawn into the collection chamber by pressing the first pump actuator and a second amount of fluid is drawn into the collection chamber by pressing the second pump actuator thereby causing an increased amount of fluid to be drawn into the collection chamber upon the simultaneous pressing of both the first and second pump actuator; and a tube extending from within the storage chamber to within the collection chamber through which the portion of liquid is pumped into the collection assembly.

22. A combined fluid collection and dispensing device comprising:

a first storage chamber for storing a first liquid;

a second storage chamber for storing a second liquid;

a collection assembly for collecting a first portion of liquid and a second portion of liquid, the collection assembly including a collection chamber having a floor, and a spout via which the portion of collected liquid is dispensed;

a pump assembly having a first and second pump actuator for selectively collecting at least a portion of the first liquid in the collection chamber utilizing the first pump actuator and at least a portion of the second liquid in the collection chamber utilizing the second pump actuator;

a first tube extending from within the first storage chamber to within the collection chamber through which the first portion of liquid is pumped into the collection assembly; and a second tube extending from within the second storage chamber to within the collection chamber through which the second portion of liquid is pumped into the collection assembly.

* * * * *